(12) United States Patent
Chou

(10) Patent No.: US 9,167,068 B2
(45) Date of Patent: Oct. 20, 2015

(54) METHODS FOR BARRING MT CALLS AND APPARATUSES USING THE SAME

(71) Applicant: Wistron NeWeb Corp., Hsinchu (TW)

(72) Inventor: Zhe-Hua Chou, Hsinchu (TW)

(73) Assignee: WISTRON NEWEB CORP., Hsinchu (TW)

(*) Notice: Subject to any disclaimer, the term of this patent is extended or adjusted under 35 U.S.C. 154(b) by 192 days.

(21) Appl. No.: 14/027,789

(22) Filed: Sep. 16, 2013

(65) Prior Publication Data

US 2015/0011188 A1    Jan. 8, 2015

(30) Foreign Application Priority Data

Jul. 3, 2013   (TW) .............................. 102123764 A

(51) Int. Cl.
*H04M 3/16* (2006.01)
*H04M 1/663* (2006.01)
*H04W 4/16* (2009.01)

(52) U.S. Cl.
CPC ................ *H04M 1/663* (2013.01); *H04W 4/16* (2013.01)

(58) Field of Classification Search
CPC .............................. H04M 1/663; H04W 4/16
USPC ...................................... 455/411, 433, 435.1
See application file for complete search history.

(56) References Cited

U.S. PATENT DOCUMENTS

2007/0197212 A1* 8/2007 Marsico et al. ............... 455/433
2008/0132231 A1* 6/2008 Balasubramanian ...... 455/435.1

* cited by examiner

*Primary Examiner* — Amancio Gonzalez
(74) *Attorney, Agent, or Firm* — Muncy, Geissler, Olds & Lowe, P.C.

(57) ABSTRACT

An embodiment of a method for call management, performed by a processing unit of a mobile device, is introduced. A telecommunications network is notified to block MT (mobile-terminated) calls through a base station after the mobile device has successfully associated with a WLAN (wireless local area network) AP (access point) deployed in a region in which noises should be avoided or limited, so as to avoid sounding a ringtone in response to a receipt of a paging reques

17 Claims, 8 Drawing Sheets

METHODS FOR BARRING MT CALLS AND APPARATUSES USING THE SAME

CROSS REFERENCE TO RELATED APPLICATIONS

This Application claims priority of Taiwan Patent Application No. 102123764, filed on Jul. 3, 2013, the entirety of which is incorporated by reference herein.

BACKGROUND

1. Technical Field

The present invention relates to call management, and in particular, relates to methods for barring MT calls and apparatuses using the same.

2. Description of the Related Art

Users can experience embarrassment when bringing a mobile phone in a quiet region, such as a lecture hall, a cinema, a library, a recording studio, an assembly hall, or others, but the mobile phone sounds a ringtone for an incoming call. There are two ways to prevent the bothersome ringtone. The user may power-down the mobile phone or manually switch the mobile phone to silent mode when seeing a posted notice, watching a reminder video, or hearing a broadcast at a particular place. Although this can avoid the bothersome sound, many users usually forget to turn their mobile phones back on and restore the ring settings, resulting in their potentially missing incoming calls. A mobile phone blocker may be employed at a particular location to interfere with or block radio frequency (RF) signals to cause nearby mobile phones to lose the ability to receive any messages broadcast from a base station. However, the mobile phone blocker bars not only incoming call requests but also other communications signals, causing the mobile phone to be unable to make outgoing calls, receive and send short messages and e-mails, and surf the Internet. In addition, the mobile phone will attempt to increase its power level to search for available cells when camping on no cell, resulting in the unnecessary consumption of battery power and a reduction in the life of the battery.

Therefore, there is a need for technologies that will allow a mobile phone to block only MT call signals but do not affect other communications when entering a particular region, and that cancels the blocking after the mobile phone in question has left the region.

BRIEF SUMMARY

An embodiment of a method for call management, performed by a processing unit of a mobile device, is introduced. A telecommunications network is notified to block MT (mobile-terminated) calls through a base station after the mobile device has successfully associated with a WLAN (wireless local area network) AP (access point) deployed in a region in which noises should be avoided or limited, so as to avoid sounding a ringtone in response to a receipt of a paging request.

An embodiment of a method for call management, performed by a network node of a telecommunications network, is introduced. An MT call-barring function is enabled for barring a paging request to a mobile device after detecting that the mobile device has successfully associated with a WLAN AP deployed in a region in which noises should be avoided or limited, so as to avoid the mobile device sounding a ringtone in response to a receipt of the paging request from a base station A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc, in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
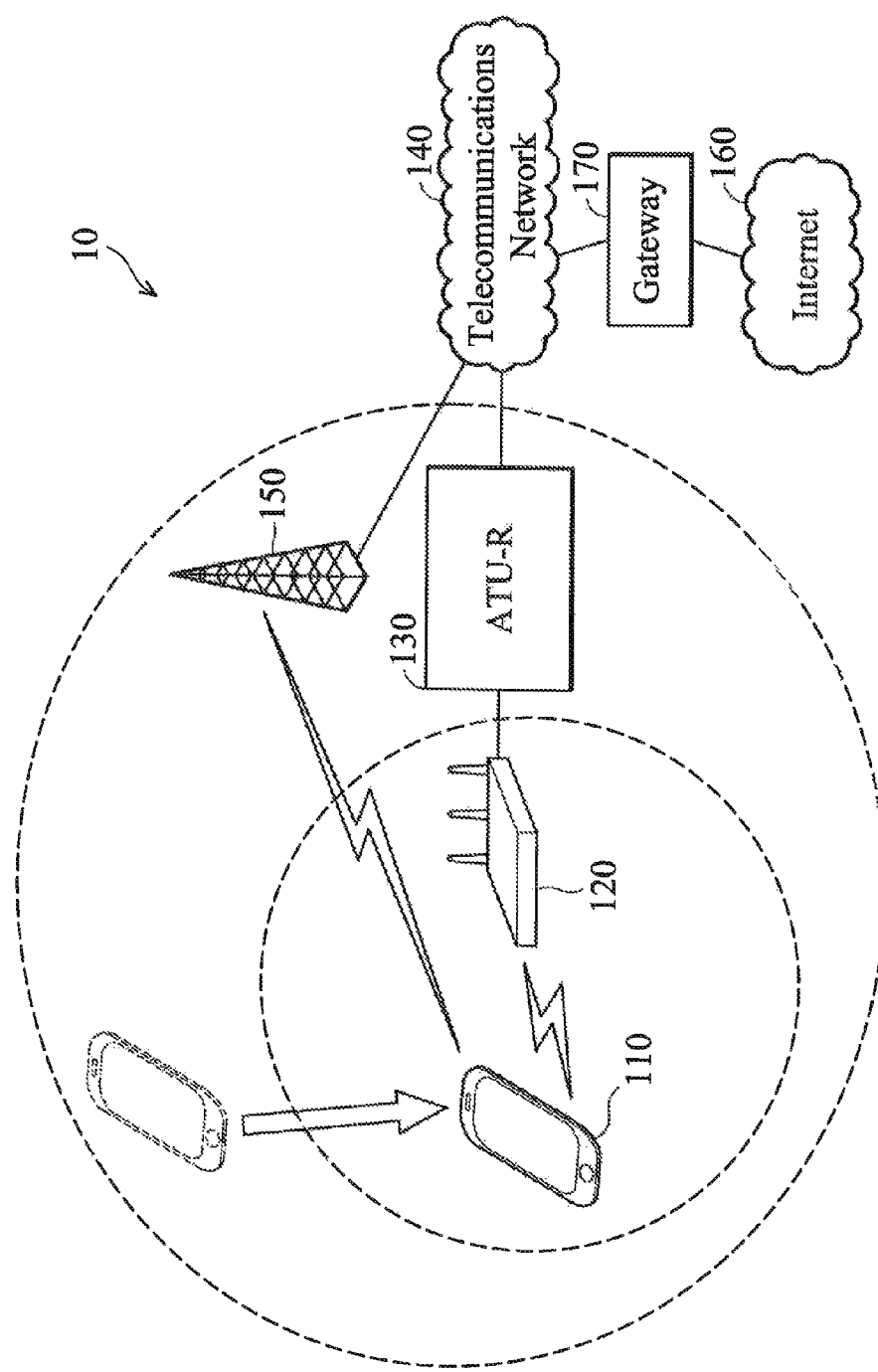
FIG. 1 is a network architecture according to an embodiment of the invention.

Call management methods are introduced according to the described embodiments of the invention. The call management methods may include MT (mobile-terminated) call-blocking methods, which block only MT calls to a mobile phone but do not affect other communications when detecting that the mobile phone is associated with a WLAN (wireless local area network) AP (access point) in a particular region in which noises should be avoided or limited. Cancellation methods for cancelling the MT call-blocking when detecting that the mobile phone has left the signal coverage of the WLAN AP may also be included in the call management methods. FIG. 1 is the network architecture according to an embodiment of the invention. The network system 10 contains at least a WLAN AP 120 installed in a particular region, such as a lecture hall, a cinema, a library, a recording studio, an assembly hall, or others, by a telecommunications operator. The WLAN AP 120 connects to the telecommunications network 140 by the ATU-R (ADSL Transceiver Unit Remote) 130. The mobile phone 110 discovers the WLAN AP 120 via a built-in Wi-Fi module when moving into signal coverage of the WLAN AP 120, and uses the wireless broadband Internet service provided by the telecommunications operator after completing the registration and authentication mechanism. The mobile phone 110 requests an AAA (Authentication, Authorization and Accounting) server for connecting to the telecommunications network 140 using the EAP-SIM (Extensible Authentication Protocol for Subscriber Identity Module). After completion of registration and authentication, packets sent from the mobile phone 110 can pass through the ATU-R 130, the telecommunications network 140 and the gateway 170 to the Internet 160. It will be appreciated by those skilled in the art that the mobile phone 110 may obtain the telecommunications service and access network resources of the Internet 160 via the base station 150 deployed by the telecommunications operator by wireless telecommunications technologies, such as GSM (Global System for Mobile Communications), GPRS (General Packet Radio Service), WCDMA (Wideband Code Division Multiple Access), CDMA2000, TD-SCDMA (Time Division-Synchronous CDMA), LTE (Long Term Evolution), TD-LTE (Time Division-Long Term Evolution), etc.

Figure 2:
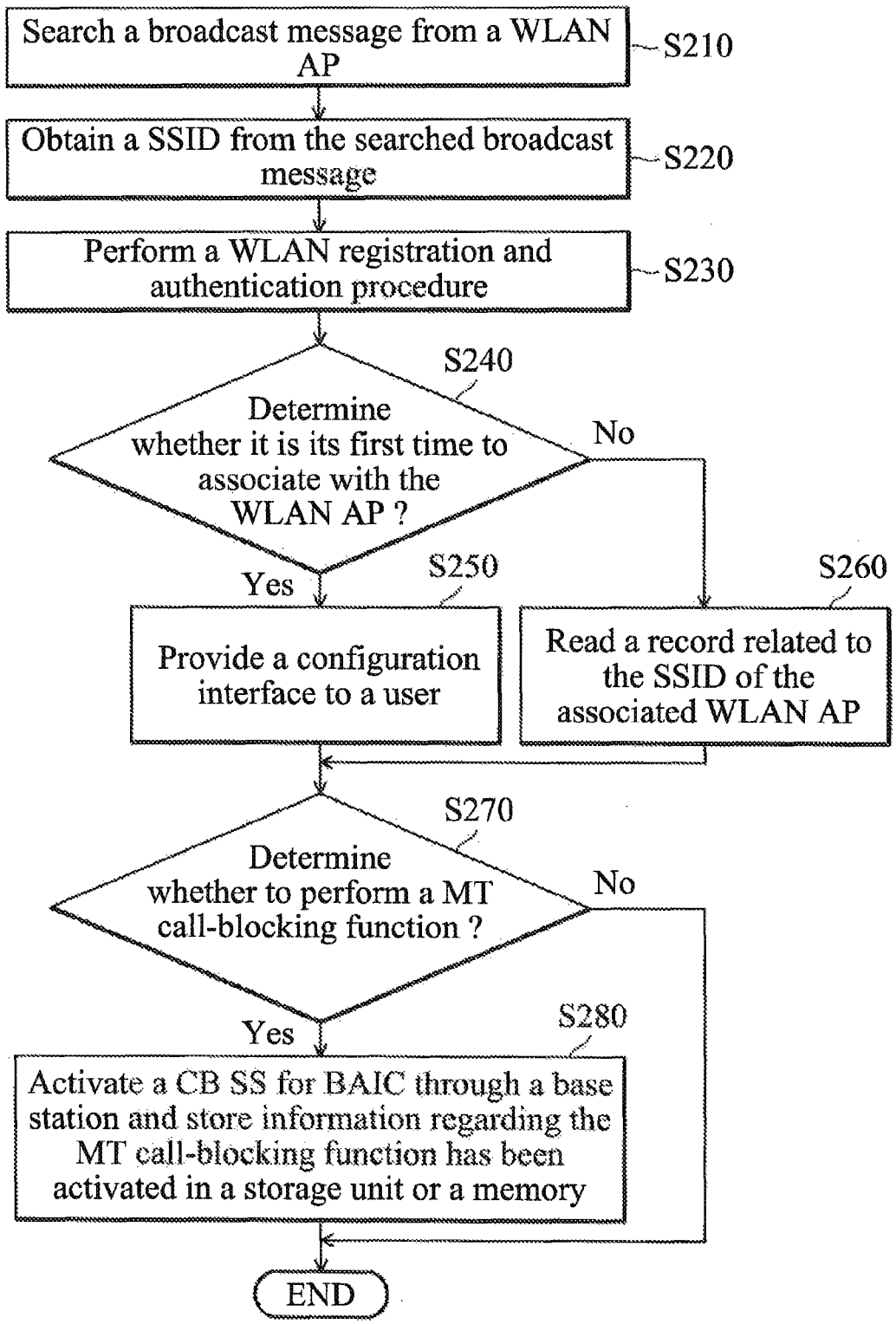
FIG. 2 illustrates a flowchart of a method for blocking MT calls according to a first embodiment of the invention.

The first embodiment of the invention introduces methods for blocking MT calls and cancelling MT call-blocking, which are triggered by the mobile phone 110. The methods are performed by the processing unit of the mobile phone 110. FIG. 2 illustrates a flowchart of a method for blocking MT calls according to a first embodiment of the invention. The processing unit can be implemented in any of numerous ways, such as with dedicated hardware, or with general purpose hardware (e.g., a single processor, multiple processors with parallel processing capabilities, a graphics processing unit, or others) that is programmed using microcode or software to perform the functions recited below. The process begins to search a broadcast message from a WLAN AP (step S210). The step may search a broadcast message in the air via a Wi-Fi module of the mobile phone 110 and determine whether the mobile phone 110 moves into the signal coverage of a particular WLAN AP, for example, the WLAN AP 120. A SSID (Service Set Identifier) is obtained from the searched broadcast message (step S220) and a WLAN registration and authentication procedure is performed (step S230).

Figure 3:
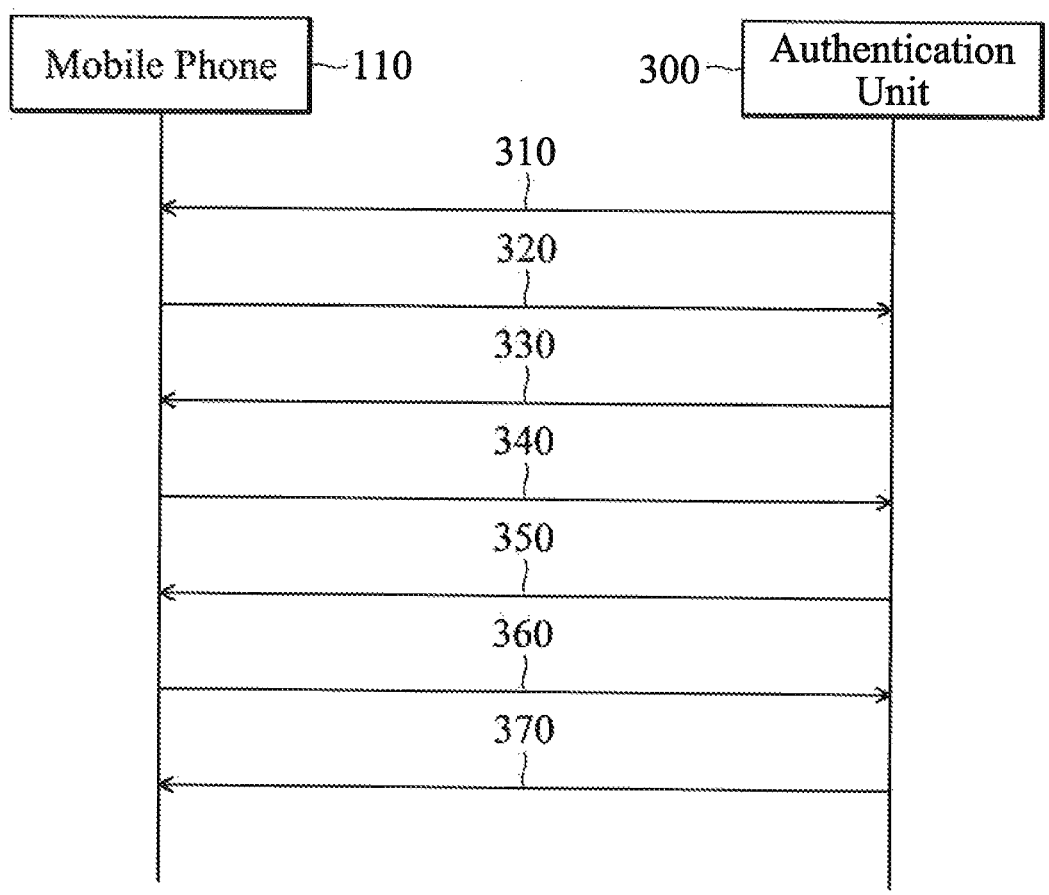
FIG. 3 illustrates a schematic diagram of an authentication message exchange according to an embodiment of the invention.

A WLAN authentication procedure performed with the mobile phone 110 is described as follows. FIG. 3 illustrates a schematic diagram of an authentication message exchange according to an embodiment of the invention. The WLAN AP 120 or the ATU-R 130 may be operated as the authentication unit 300 shown in FIG. 3 for authenticating the mobile phone 110. The authentication unit 300 sends an EAP-Request/Identity 310 to the mobile phone 110, and the mobile phone 110 replies to the authentication unit 300 with an EAP-Response/IMSI (International Mobile Subscriber Identity) 320. The IMSI is provided by a telecommunications operator and stored in a SIM (Subscriber Identity Module) of the mobile phone 110, which is composed of an MCC (Mobile Country Code), an MNC (Mobile Network Code) and an MSIN (Mobile Subscriber Identification Number). The authentication unit 300 passes the IMSI to an EAP server (not shown) of the telecommunications network 140, and subsequently passes a EAP-Request/SIM/Start(AT-VERSION_LIST) 330, which is generated by the EAP server (not shown), to the mobile phone 110 so as to initiate an authentication process between the mobile phone 10 and the EAP server (not shown). In order to respond to the EAP-Request/SIM/Start(AT-VERSION_LIST) 330, the mobile phone 110 sends an EAP-Response/SIM/Start(AT_NONCE_MT,AT_SELECTED_VERSION) 340 to the EAP server via an authentication unit 300, which contains a "AT_NONCE_MT" attribute recording a random number "NONCE_MT" generated by the mobile phone 110, and a "AT_SELECTED_VERSION" attribute recording a version number selected by the mobile phone 110. All selectable version numbers are originally stored in the "AT-VERSION_LIST" attribute of the EAP-Request/SIM/Start(AT-VERSION_LIST) 330. Subsequently, the authentication unit 300 passes an EAP-Request/SIM/Challenge(AT_RAND, AT_MAC) 350, which is generated by the EAP server (not shown), to the mobile phone 110. A random number recorded in the "AT_RAND" attribute and an MAC (message authentication code) recorded in the "AT_MAC" attribute may be provided by an AuC (Authentication Center, not shown) in terms of the IMSI of the mobile phone 110. The mobile phone 110 uses an authentication algorithm to calculate an MAC according to the random number after receiving the EAP-Request/SIM/Challenge(AT_RAND,AT_MAC) 350, and determines whether the received MAC and the calculated MAC are a match. If so, the mobile phone 110 determines that the connected telecommunications network 140 is secure. Then, the authentication unit 300 passes the EAP-Response/SIM/Challenge(AT_MAC) 360, which is generated by the mobile phone 110, to the EAP server, where the "AT_MAC" attribute includes an MAC. The EAP server (not shown) uses an authentication algorithm to calculate an MAC according to the random number "NONCE_MT" of EAP-Response/SIM/Start(AT_NONCE_MT,AT_SELECTED_VERSION) 340 after receiving the EAP-Response/SIM/Challenge,(AT_MAC) 360, and determines whether the received MAC and the calculated MAC are a match. If so, the EAP server (not shown) determines that the mobile phone 110 is an eligible subscriber, and sends an EAP-Success 370 to the mobile phone 110 via the authentication unit 300. The exchanged messages between the mobile phone 110 and the WLAN AP 120 may be encrypted and decrypted by the WPA (Wi-Fi Protected Access) and/or WPA2 technologies. It may consider that the mobile phone 110 is successfully associated with the WLAN AP 120 after receiving the EAP-Success 370.

Figure 4:
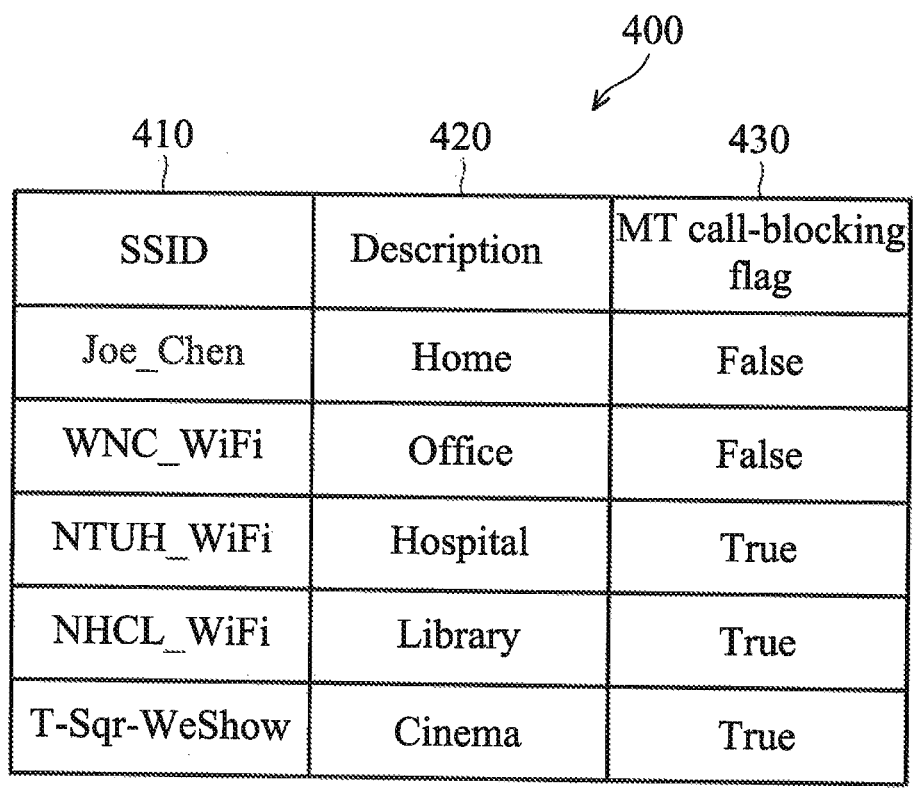
FIG. 4 is a schematic diagram of a blocking configuration table according to a first embodiment of the invention.

After the WLAN registration and authentication procedure is completed, it is determined whether this is the first time associating with the WLAN AP (step S240). The determination may be achieved by inspecting a blocking configuration table stored in a storage unit. The storage unit is a non-volatile storage device, such as a flash memory, in which the stored data will not disappear after powering off or powering down. FIG. 4 is a schematic diagram of the blocking configuration table 400 according to a first embodiment of the invention, which contains at least three fields: SSID 410; description 420; and MT call-blocking flag 430. Each record suggests whether the MT call-blocking function is activated when the mobile phone 110 moves into the signal coverage of a WLAN AP with a particular SSID. Specifically, if the processing unit finds no record present in the blocking configuration table 400 corresponding to the associated WLAN AP with a particular SSID, then it determines that this is its first time associating with the WLAN AP. Otherwise, the processing unit determines that this is not its first time associating with the WLAN AP. When it is determined that this is its first time associating with the WLAN AP ("Yes" path of step S240), a configuration interface is provided to the user (step S250). The user may interact with the configuration interface to suggest if the MT call-blocking function will be activated directly without any user involvement when the mobile phone 110 associates with this WLAN AP. The processing unit appends a corresponding record into the blocking configuration table 400 of the storage unit after receiving user input via the configuration interface. For example, a new record suggesting that it will require an activation of the MT call-blocking function is appended into the blocking configuration table 400 when the mobile phone associates with this WLAN AP in the future. When this is not its first time associating with the WLAN AP ("No" path of step S240), the record related to the SSID of the associated WLAN AP is read (step S260).

Subsequent to step S250 or S260, it is determined whether to perform the MT call-blocking function (step S270). If so, a CB (Call Barring) SS (Supplementary Service) for BAIC (Barring All Incoming Calls) is activated through the base station 150, and information regarding the MT call-blocking function having been activated is stored in a storage unit or a memory (step S280); otherwise, the whole process ends. Specifically, when this is its first time associating with the WLAN AP and the processing unit receives user input from the configuration interface indicating that aft MT calls have to be blocked, the process proceeds to step S280. When this is not its first time associating with the WLAN AP and an MT call-blocking flag is "true" in the read record, the process proceeds to step S280. In step S280, the processing unit of the mobile phone 110 may utilize a baseband module and an RF (radio frequency) module to notify the telecommunications network 140 of the activation of the CB SS, and the notification selects a barring program of BAIC. Moreover, in step S280, the processing unit sets an activation flag of a storage unit or a memory as "true" to indicate that the MT call-blocking function has been activated. When the CB SS for BAIC is activated and another electronic device is attempting to establish a call connection with the mobile phone 110 through the telecommunications network 140, a network node of the telecommunications network 140 may send a speech message to notify the user of the electronic device that the mobile phone 110 is currently unable to answer the phone call and suggest leaving a voice message in a voice mailbox. The mobile phone 110 will not be notified that there is an electronic device attempting to establish a call connection, and thus the mobile phone 110 will not sound an MT call ringtone. It should be understood that, since the telecommunications network 140 ignores call connection establishment requests from other electronic devices and does not send any paging requests to the mobile phone 110 to avoid sounding the ringtone, other communications services are maintained, and the mobile phone 110 may receive or send short messages, for example, or make an MO (mobile-originated) call, or make use of other basic services or SS via the base station 150. In addition, it will be appreciated that the mobile phone 110 may use different sorts of communications protocols to camp on the base station 150 and associate with the WLAN AP 120 to use the different ANs (access networks) at the same time, and the mobile phone 110 may access resources presented via the Internet 160 through the base station 150 or the WLAN AP 120.

Although the embodiment has been described having specific features, such as using the blocking configuration table 400 to facilitate the determination whether to activate the MT call-blocking function, it is noted that these are merely exemplary features, and it may require a decision from the user each time a determination is requires as to Whether to activate the MT call-blocking function. That is, it has to request a decision from the user via the configuration interface each time. In other words, the process may be modified to omit steps S240 and S250.

Figure 5:
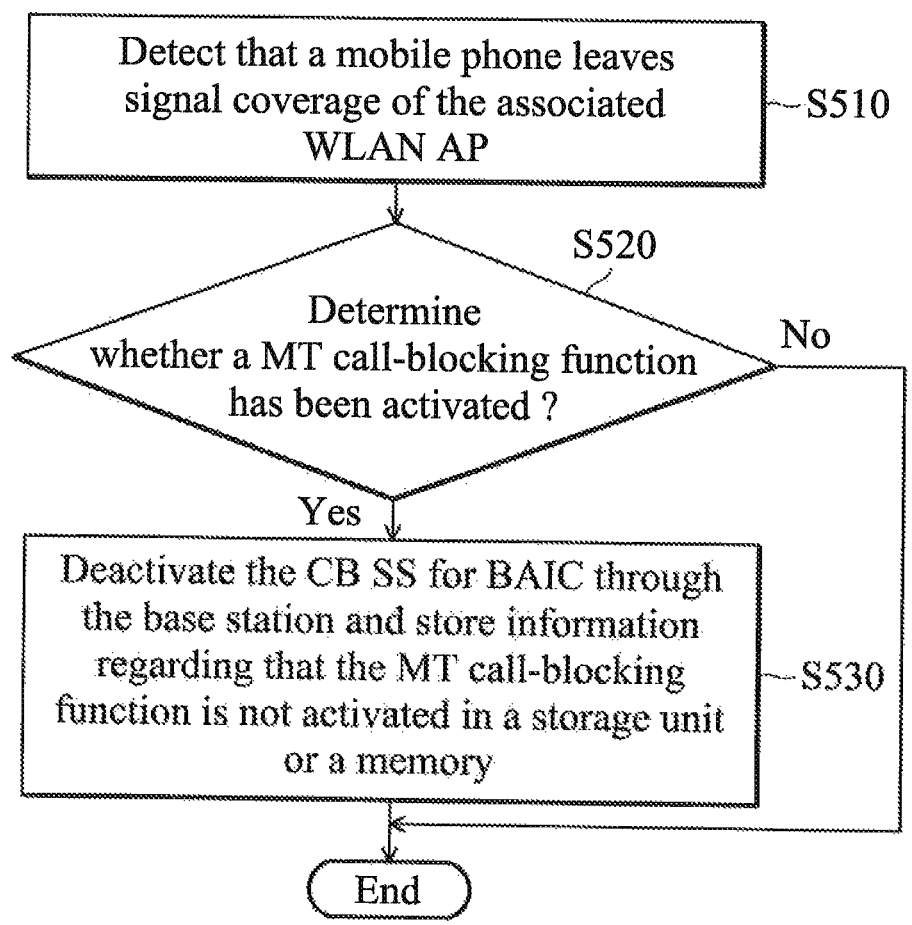
FIG. 5 illustrates a flowchart of a method for cancelling MT call-blocking according to a first embodiment of the invention.

FIG. 5 illustrates a flowchart of a method for cancelling MT call-blocking according to a first embodiment of the invention. After the processing unit detects that a mobile phone (e.g. the mobile phone 110) has left the signal coverage of the associated WLAN AP (e.g. the WLAN AP 120) (step S510), it is determined whether the MT call-blocking function has been activated (step S520). In step S520, the processing unit may determine whether the activation flag of the storage unit or the memory is "true". If so ("Yes" path of step S520), the CB SS for BAIC is deactivated through the base station 150, and information regarding the MT call-blocking function not having been activated is recorded in a storage unit or a memory (step S530); otherwise, the whole process ends. In step S530, the processing unit of the mobile phone may utilize a baseband module and an RF module to notify the telecommunications network of a deactivation of the CB SS, and the notification selects a barring program of BAIC, enabling the telecommunications network 140 to restore the sending of paging requests to the mobile phone when other electronic devices attempt to establish call connections with the mobile phone.

Figure 6:
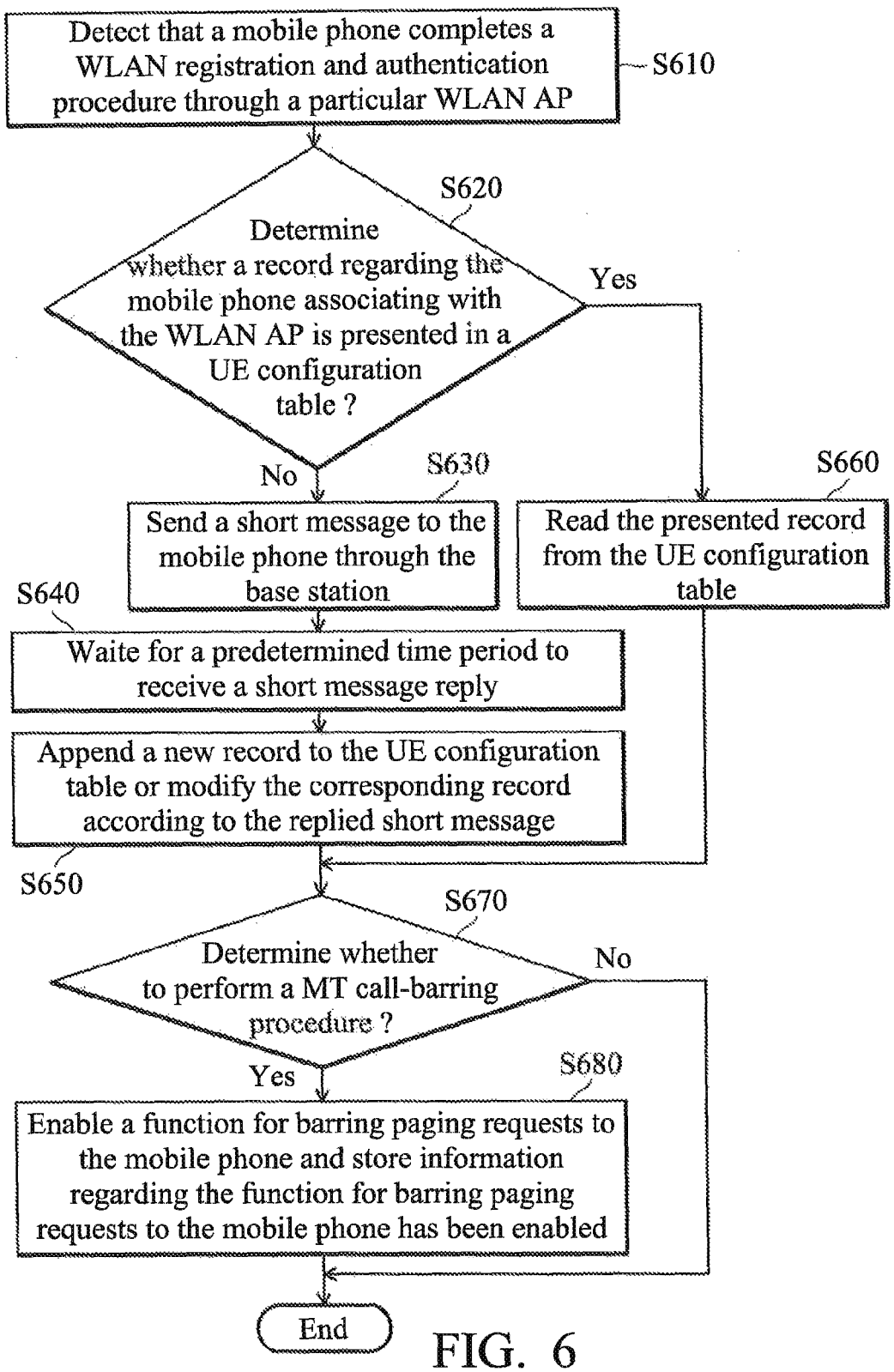
FIG. 6 illustrates a flowchart of a method for barring MT calls according to a second embodiment of the invention.
Figure 7:
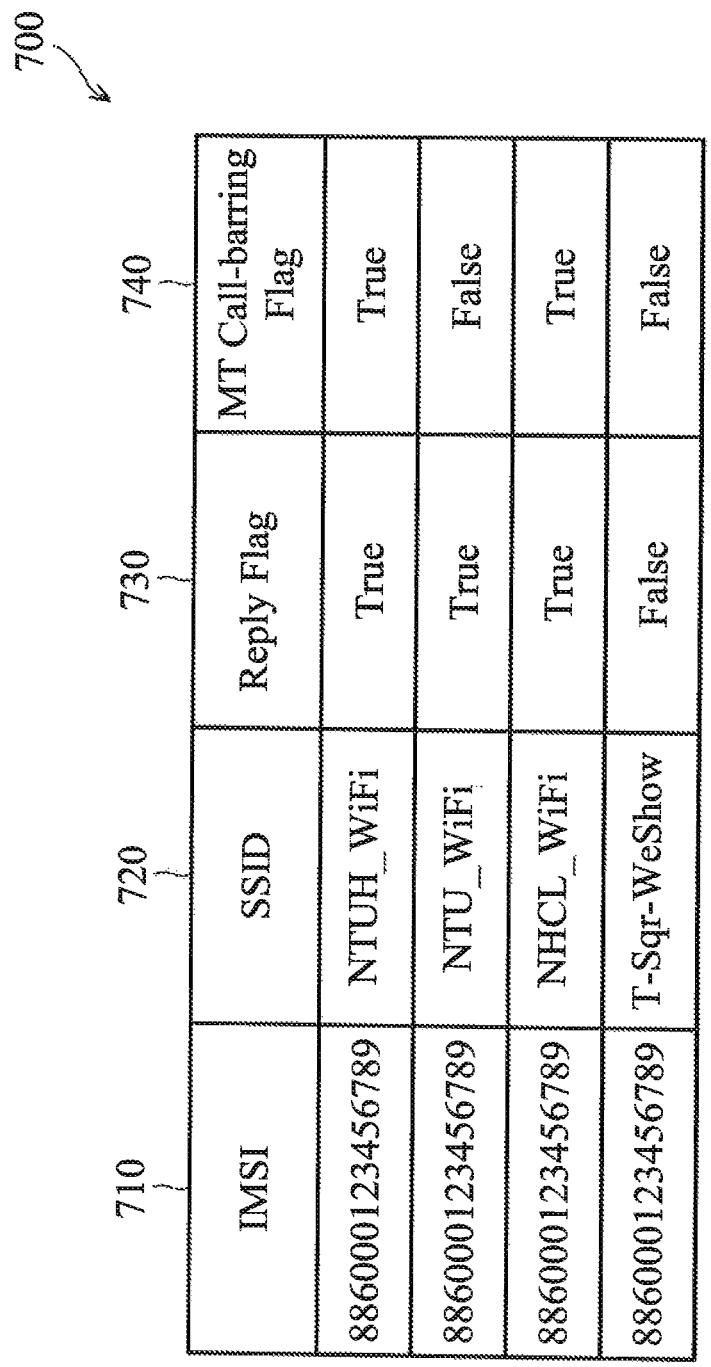
FIG. 7 is a schematic diagram of the UE configuration table 700 according to a second embodiment of the invention.

The second embodiment of the invention introduces methods for barring MT calls and cancelling MT call-barring, which are triggered by at least one network node of the telecommunications network 140. The network node may be an MSC (Mobile Switching Center), an SMSC (Short Message Switching center), or any network node present in the telecommunications network 140. FIG. 6 illustrates a flowchart of a method for barring MT calls according to a second embodiment of the invention. After a network node of the telecommunications network 140 detects that a mobile phone (e.g. the mobile phone 110) has completed a WLAN registration and authentication procedure through a particular WLAN AP (e.g. the WLAN AP 120) (step S610), it is determined whether a record regarding the mobile phone associating with the WLAN AP is present (step S620). The associated WLAN AP is deployed in a quiet region, such as a lecture hall, a cinema, a library, a recording studio, an assembly hall, or others, and SSIDs of the WLAN APs deployed in the quiet regions are collectively stored in a network node of the telecommunications network 140. References to the WLAN registration and authentication procedure are made in the description of FIG. 2. The determination performed in step S620 may be achieved by inspecting a UE (user equipment) configuration table stored in a storage unit of a network node present in the telecommunications network 140. FIG. 7 is a schematic diagram of the UE configuration table 700 according to a second embodiment of the invention, which contains at least four fields: IMSI 710; SSID 720; reply flag 730; and MT call-barring flag 740. The reply flag field 730 records whether a UE with a particular IMSI has replied to a short message requesting the setting of an MT call-barring status when the UE is associated with a WLAN AP with a particular SSID, in which a "true" value indicates that the UE has replied to the short message, and a "false" value indicates that the UP, has not replied to the short message. Details of the short message will be described as follows. The MT call-barring flag field 740 records an MT call-barring status when a UE with a particular IMSI associates with a WLAN AP with a particular SSID, in which a "true" value indicates that the UE needs to automatically enable the MT call-barring when associating with the designated WLAN AP, and a "false" value indicates that the UE has no need to automatically enable the MT call-barring when associating with the designated WLAN AP. Specifically, if a processing unit of a network node finds at least one record present in the UE configuration table 700 that corresponds to the associated WLAN AP with a particular SSID for a UE with a particular IMSI, or if the reply flag field 730 of the record stores a "true" value, then the processing unit determines that a record regarding the mobile phone associating with the WLAN AP is present. Otherwise, the processing unit determines that a record regarding the mobile phone associating with the WLAN AP is absent. After determining that a record regarding the mobile phone associating with the WLAN AP is present ("yes" path of step S620), the record is read from the UE configuration table 700 (step S660). After determining that a record regarding the mobile phone associating with the WLAN AP is absent ("no" path of step S620), a short message is sent to the mobile phone through the base station (e.g. the base station 150) that the mobile phone is camped on notifying the user that he/she can enable the MT call-blocking function by replying to this short message (step S630). Subsequently, a reply to the short message is awaited for a predetermined period of time (step S640), and a new record is appended to the UE configuration table 700 or the corresponding record thereof is modified according to the reply to the short message (step S650). In step S630, a virtual phone number, such as "1234" may be used to send the short message notification, and the short message notification may prompt the activation of the MT call-blocking function when the user replies "1," whereas the function is not enabled when the user replies "2", in step S650, for example, both values of the reply flag field 730 and the MT call-barring flag 740 of the appended or modified record are set to "true" when the short message reply contains "1", and the values of the reply flag field 730 and the MT call-barring flag 740 of the appended or modified record are set to "true" and "false", respectively, when the reply to the short message contains "2".

Although the embodiment has been described having specific features, such as using the UE configuration table 700 to facilitate the determination of whether to enable the MT call-barring function, it is noted that these are merely exemplary features, it may require a decision from the user each time when determining whether to perform the MT call-barring function. That is, it has to request a decision from the user via a reply to the short message each time. In other words, the process may be modified to omit steps S620, S650 and S660.

Subsequent to step S650 or S660, it is determined whether to perform an MT call-barring procedure (step S670). If so, a function for barring paging requests to the mobile phone is enabled, and information regarding the function for barring paging requests to the mobile phone having been enabled is stored (step S680); otherwise, the whole process ends. Specifically, the process proceeds to step S680 when a record regarding the mobile phone having been associated with the WLAN AP is present and the value of the MT call-barring field 740 of the record is "true". In another situation, the process proceeds to step S680 when a record regarding the mobile phone having been associated with the WLAN AP is absent and a reply to the short message contains "1". In step S680, an enabling flag corresponding to the mobile phone may be set to "true" to indicate that the function for barring paging requests to the mobile phone has been enabled. For example, when the function for barring paging requests to the mobile phone is enabled and another electronic device is attempting to establish a connection with the mobile phone 110 through the telecommunications network 140, a network node of the telecommunications network 140 may send a speech message to notify the user of the electronic device that the mobile phone 110 is currently unable to answer the phone call and suggest leaving a voice message in a voice mailbox. The mobile phone 110 will not be notified that there is an electronic device attempting to establish a connection, and thus the mobile phone 110 will not sound an MT call ringtone.

Figure 8:
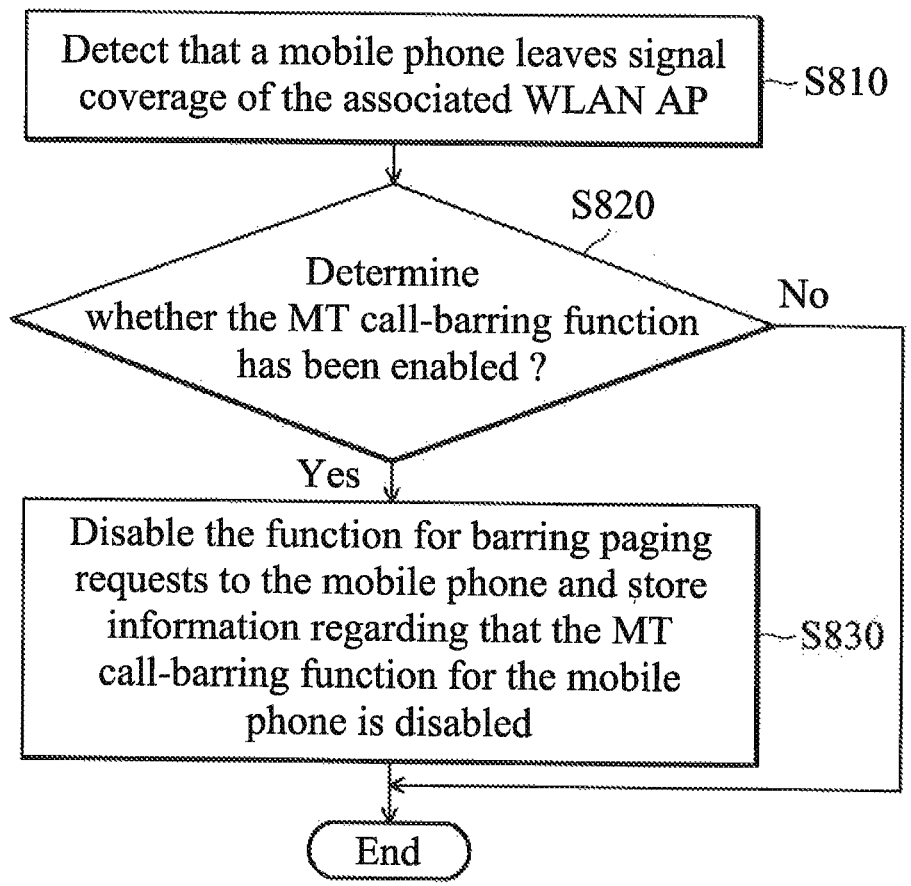
FIG. 8 illustrates a flowchart of a method for cancelling MT call-barring according to a second embodiment of the invention.

FIG. 8 illustrates a flowchart of a method for cancelling MT call-barring according to a second embodiment of the invention. After a network node of the telecommunications network 140 detects that a mobile phone (e.g. mobile phone 110) has left the signal coverage of the associated WLAN AP (e.g. WLAN AP 120) (step S810), it is determined whether the MT call-barring function has been enabled (step S820). In step S820, the network node may determine whether the enabling flag for the mobile phone is "true". If so ("Yes" path of step S820), the function for barring paging requests to the mobile phone is disabled, and information regarding the MT call-barring function for the mobile phone not having been enabled is recorded (step S830); otherwise, the whole process ends. In step S830, the enabling flag h mobile phone may be set to "false" to indicate that the function for barring paging requests to the mobile phone is not enabled. When the MT call-barring function for the mobile phone is not enabled and another electronic device attempts to establish a call connection with the mobile phone through the telecommunications network, the telecommunications network 140 resumes sending paging requests to the mobile phone.

Although the embodiments describe mobile phones as examples, the invention can be applied to other electronic devices, such as tablet PCs, dual-mode wireless network cards, or others. Although the embodiments have been described, by having specific elements in FIG. 1, it is noted that additional elements may be included to achieve better performance without departing from the spirit of the invention. While the process flows described in FIG. 2, FIG. 5, FIG. 6 and FIG. 8 each include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for call management, performed by a processing unit of a mobile device, comprising:
notifying a telecommunications network to block MT (mobile-terminated) calls through a base station after successfully associating with a WLAN (wireless local area network) AP (access point) deployed in a region so as to avoid sounding a ringtone in response to a receipt of a paging request,
wherein the WLAN AP is deployed in the region in which noises should be avoided or limited.

2. The method of claim 1, wherein the step for notifying the telecommunications network to block MT calls further comprises:
notifying the telecommunications network with an activation of a CB (call barring) SS (supplementary service) for BAIC (barring all incoming calls) through the base station after associating with the WLAN AP, thereby disabling the telecommunications network's ability to send the paging request to the mobile device.

3. The method of claim 1, further comprising:
using a communications service other than the MT calls after notifying the telecommunications network to block the MT calls.

4. The method of claim 1, further comprising:
notifying the telecommunications network to cancel the MT call-blocking through the base station after leaving signal coverage of the WLAN AP, thereby enabling the telecommunications network to resume a sending of the paging request to the mobile device.

5. The method of claim 4, wherein the step for notifying the telecommunications network to cancel the MT call-blocking further comprises:
notifying the telecommunications network of a deactivation of the CB SS for BAIC through the base station after leaving signal coverage of the WLAN AP, thereby enabling the telecommunications network to send a paging request to the Mobile device when detecting that another electronic device is attempting to establish a call connection with the mobile device.

6. The method of claim 1, wherein the step for notifying the telecommunications network to block MT calls further comprises:
determining whether to activate an MT call-blocking function by inspecting a blocking configuration table stored in a storage unit of the mobile device after successfully associating with the WLAN AP deployed in the region; and
notifying the telecommunications network to block MT calls through the base station after determining a need for activation of the MT call-blocking function so as to avoid sounding a ringtone in response to a receipt of a paging request.

7. The method of claim 1, wherein the step for notifying the telecommunications network to block MT calls further comprises:
providing a configuration interface to a user after associating with the WLAN AP deployed in the region successfully; and
notifying the telecommunications network to block MT calls through the base station after receiving user input from the configuration interface, which indicates that MT calls have to be blocked, so as to avoid sounding a ringtone in response to a receipt of a paging request.

8. The method of claim 1, wherein the step for notifying the telecommunications network to block MT calls further comprises:
determining whether this is its first time associating with the WLAN AP by inspecting a blocking configuration table stored in a storage unit of the mobile device after successfully associating with the WLAN AP deployed in the region;
if so, providing a configuration interface to a user; and
notifying the telecommunications network to block MT calls through the base station after receiving user input from the configuration interface, which indicates that MT calls have to be blocked, so as to avoid sounding a ringtone in response to a receipt of a paging request.

9. The method of claim 8, wherein the step for notifying the telecommunications network to block MT calls further comprises:
appending a new record into the configuration table, which suggests that it will require MT call-blocking when the mobile device associates with the WLAN AP in the future.

10. The method of claim 1, further comprising:
accessing Internet resources through the WLAN AP after associating with the WLAN AP successfully.

11. A method for call management, performed by a network node of a telecommunications network, comprising:
enabling an MT (mobile-terminated) call-barring function for barring a paging request to a mobile device after detecting that the mobile device has successfully associated with a WLAN (wireless local area network) AP (access point) deployed in a region so as to avoid the mobile device sounding a ringtone in response to a receipt of the paging request from a base station,
wherein the WLAN AP is deployed in a region in which noises should be avoided or limited.

12. The method of claim 11, further comprising:
disabling the MT call-barring function after detecting that the mobile device has left the signal coverage of the WLAN AP, thereby enabling the telecommunications network to resume a sending of the paging request to the mobile device when detecting that another electronic device is attempting to establish a call connection with the mobile device.

13. The method of claim 11, wherein the step for enabling the MT call-barring function further comprises:
inspecting a record of a UE (user equipment) configuration table, which regards the mobile device as being associated with the WLAN AP, after detecting that the mobile device has successfully associated with the WLAN AP deployed in the region; and
enabling the MT call-barring function after detecting that the record comprises information regarding the mobile device needing to enable the MT call-barring function when associating with the WLAN AP, so as to avoid the mobile device sounding a ringtone in response to a receipt of a paging request from the base station.

14. The method of claim 11, wherein the step for enabling the MT call-barring function further comprises:
sending a short message to the mobile device through the base station, informing a user that he/she can enable the MT call-barring function by replying to the short message, after detecting that the mobile device has successfully associated with the WLAN AP deployed in the region; and
enabling the MT call-barring function after receiving a reply to the short message indicating that MT calls have to be barred, so as to avoid the mobile device sounding a ringtone in response to a receipt of a paging request from the base station.

15. The method of claim 11, wherein the step for enabling MT call-barring function further comprises:
inspecting whether a record is present in a UE (user equipment) configuration table, which regards the mobile device as being associated with the WLAN AP after detecting that the mobile device has successfully associated with the WLAN AP deployed in the region;
if not, sending a short message to the mobile device through the base station, informing a user that he/she can enable the MT call-barring function by replying to the short message; and
enabling the MT call-barring function after receiving a reply to the short message indicating that MT calls have to be barred, so as to avoid the mobile device sounding a ringtone in response to a receipt of a paging request from the base station.

16. The method of claim 15, wherein the step for enabling the MT call-barring function further comprises:

appending a new record into the UE table, which suggests that it will require enabling the MT call-barring function when the mobile device associates with the WLAN AP in the future.

17. The method of claim 11, wherein the mobile device uses different sorts of communications protocols to camp on the base station and associate with the WLAN AP at the same time.

\* \* \* \* \*